Nov. 24, 1964   F. JAKLITSCH   3,158,175
COMPRESSOR VALVES
Filed Feb. 8, 1963

INVENTOR.
FRANZ JAKLITSCH
BY H. M. Saragovitz
E. J. Kelly, H. Berl & E. P. Barthel

United States Patent Office 3,158,175
Patented Nov. 24, 1964

3,158,175
COMPRESSOR VALVES
Franz Jaklitsch, 823 Marywood, Royal Oak, Mich.
Filed Feb. 8, 1963, Ser. No. 257,825
1 Claim. (Cl. 137—516.19)
(Granted under Title 35, U.S. Code (1952), sec. 266)

This invention may be used by or for the U.S. Government for governmental purposes without payment of royalty therefor.

This invention relates to inlet and discharge valves for compressors and more particularly to such unattached and independent plate valves for gas or air compressors wherein the valvular members are of the thin ring type which must be automatically opened and closed quickly at brief intervals of time. The reciprocating compressors using the subject valves are designed to operate in the range up to 2500 revolutions per minute and more.

The rings for automatic valves of compressors and pumps and the like are opened by the overpressure of gases or liquid fluids through the apertures of the valve body. The fluid jet is directed around the inner and outer edges of the valve rings during a change in direction of flow. A damper is provided to limit the valve ring lift as well as to absorb its shock of impact. Nozzle-like ducts are provided to decrease the flow losses during the admission or discharge of the valve.

Prior art compressor valves have in general spring systems incorporated in the valves which act as a closing device after the reversing point of the valve ring movement is reached. If high speed is combined with high compression ratios per stage, the result will be high acting compression temperatures which produce a rapid decrease in resilience and strength of the springs and thus impair their function. Prior attempts to abandon the use of springs has resulted in an untimely destruction of the valve ring. The reason for this seems to be the fact that a small delay in the disengagement of the valve ring from the damper in high speed compressors results in tremendously high closing impacts. A demolition of the valve ring is, therefore, only a question of time.

One object of the invention is to provide a valve construction in which the inertia and impact of the valve will be substantially reduced so that there will be minimum wear of the valve rings.

Another object of the present invention is to provide a valve of the type described above in which the flow of the gaseous medium through the valve is streamlined to reduce turbulence by shaping the annular dampers in an airfoil manner.

A further object of the invention is to provide a compressor valve shaped in such a manner that the closing force on the valve ring is provided by the gaseous fluid itself during the reversed flow through the discharge valve.

Still another object of the present invention is to provide a valve wherein the contact area between the valve ring and the damper member is reduced to a minimum so that the maximum surface area of the valve ring is exposed to the closing force of the gaseous flow.

A further object of the invention is to provide a valve wherein the elastic deformation of the valve ring is allowed to increase to its maximum on impact with the damper whereby a momentum is imparted to the valve ring in its closing direction to assist in the separation of the valve ring from its contact with the damper in closing the valve.

Other objects of the present invention will become apparent from the description of one embodiment when read with reference to the accompanying drawings in which.

Figure 1:
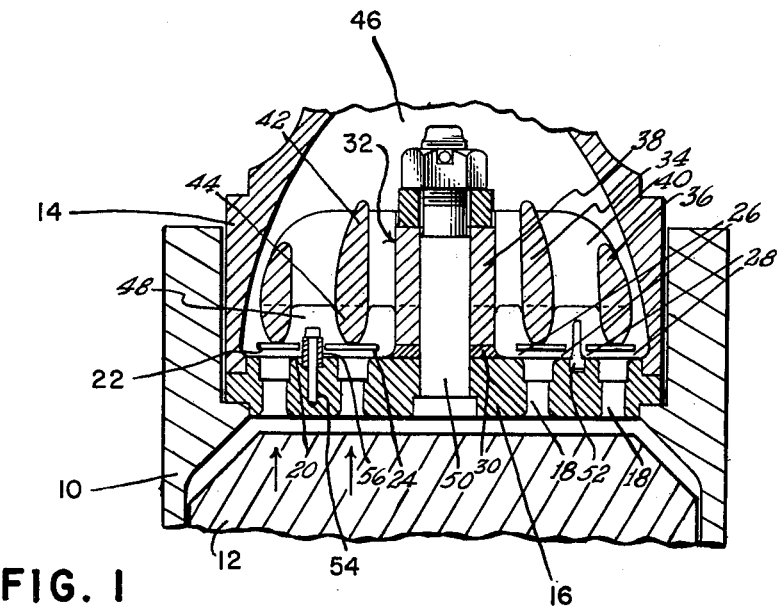
FIG. 1 is a longitudinal section view of the discharge valve, embodying features of my invention.

Referring now to the drawing and initially to FIG. 1, a cylinder 10 is shown having a piston 12 driven by a source of power (not shown). Cylinder 10 is provided with a valve housing 14 to which a valve seat 16 is attached. The seat 16 has ports 18 which can have a circular or slot configuration to allow for flow of air or other gaseous mediums. The seat member 16 is provided at its upper side 20 with a seating surface being ground off to a common plane. A pair of concentric valve rings 22 and 24 formed of a steel alloy and adapted to be seated on the surface 20 are shown at their maximum lift positions to form openings 26 and 28 which communicate with the ports 18. The spacer 30 controls the lift distance of the valve rings by fixing the vertical position of the damper member 32.

The damper 32, which is the subject of the instant invention, consists of concentric annular members 34 and 36 which are connected to a central bushing 38 by means of radiating gills 40. The annular dampers are shaped in generally a plan airfoil design having a single camber exterior surface in vertical cross section with the cambered surface facing outward. The opposite outward and inward side surfaces merge at the upper distal ends 42 of the airfoil body into a rounded edge surface. The side surfaces merge at the lower proximal ends 44 into a flat edge surface which is shown in contact with valve rings 22. It will be noted that the flat edge surfaces contact only the central portion of the valve rings and the valve rings are greater in radial width than the maximum thickness of the annular dampers 34 and 36, the dimension of the dampers taken normal to the air flow shown by the arrows. The reduction in the contact area at the proximal ends 44 permits the valve rings to elastically deform or flex about its mean diameter on impact with the annular dampers while also reducing the flow resistance and substantially increasing the area of upper surfaces of the valve rings exposed to the reversed flow of the discharge gaseous or liquid fluid. The energy stored in the elastically deformed valve rings during impact flex the rings in the downward valve closing direction thus helping the returning air to disengage the ring from the damper.

The bending action reduces the delay in starting the closing travel of the rings to the surface 20. By starting the closing movement sooner than conventional valves less force is required by compressed gases returning to the cylinder to move the valve rings away from the flat edge surfaces of the damper. The result attained in reducing valve ring wear is the same as if the lift of the valve were shortened thereby producing less momentum and (with a given weight of valve ring) a lighter blow upon the valve seat 20.

The airfoil design of the annular dampers has a further effect to increase the efficiency of high speed valves. The streamlined plain airfoil shape reduces the transition losses caused by the reduction in area from the larger bore 46 to the smaller openings 48 between the annnular dampers 34 and 36. Also, the friction loss due to the high velocity between the annular dampers is reduced by the novel airfoil design. Without this particular design conventional valves produce excessive turbulence with the result that the inwardly (downwardly) produced air jet will not act as effectively over the upper surface of the valve plates. The closing time delay caused by the turbulence of existing valves contribute to the high impact which is greatly reduced with valves designed in accordance with the instant invention.

The damper 32 is fastened by means of bolt 50 to the valve body. A streamlined guidance ring 52 insures that the air flow discharged during the exhaust period through the apertures 26 and 28 is separated to reduce turbulence. The bolt 54 is used to secure the ring 52 while the bushing 56 acts as a guide for the valve rings during their lift travel.

Figure 2:
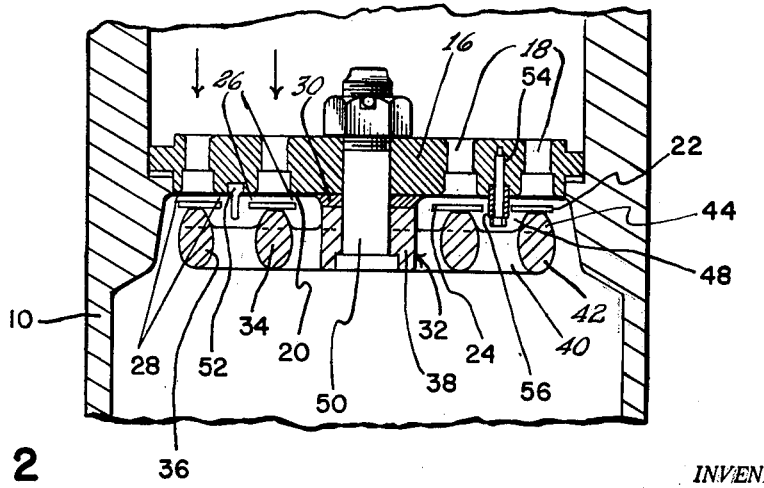
FIG. 2 is a longitudinal section view of an intake valve, embodying my invention.

FIG. 2 is a drawing showing an intake valve that is designed to work in conjunction with the discharge valve of FIG. 1. The action of both valves is identical insofar as the instant invention is concerned. The foregoing description covers the action of the intake valve with the exception that the downward movement of the piston (not shown) opens and the upward movement closes the valve of FIG. 2. The annular dampers of FIG. 2 are shown reduced in depth to provide a minimum of clearance for the piston travel when engine design requires a more compact arrangement. It will be noted that both the side surfaces of the members 34 and 36 are curved to produce a double camber airfoil design. Thus, the particular side surfaces of the air foil may be varied in design, depending on the flow characteristics of the cylinder, without departing from the spirit of this invention.

Although a specific embodiment of the invention has been illustrated and described, it will be understood that various alterations in the details of construction may be made without departing from the scope of the invention as indicated in the following claim.

I claim:

In a ring type high speed compressor valve operating in the range of 2500 revolutions per minute comprising a thin ring disc-valve element, said disc-valve movable to and from its closed position in response solely to aerodynamic forces, a valve seat having circular slots adapted to be closed by said disc-valve, a hollow cylindrically shaped damper having its axis of rotation coaxial with the center of said disc-valve, said damper having its side walls shaped in airfoil cross-section taken through the axis of rotation of said damper, the continuous leading edge contact surface of said airfoil damper located adjacent said valve seat and furnishing an uninterrupted annular support for said disc-valve, the maximum thickness of said airfoil cross-section being substantially equal to the radial width of said slots, the chord line of said airfoil cross-section being in substantial alignment with the mean diameter of said disc-valve whereby when said leading edge contact surface of said damper contacts said disc-valve at least fifty percent of the upper surface area of said disc-valve is exposed to aerodynamic forces, said leading edge contact surface of said airfoil damper allowing the free portions of said disc-valve to elastically deform about its mean diameter upon impact with said damper whereby the elastic energy combines with said aerodynamic forces to initiate and support the closing lift.

References Cited by the Examiner

UNITED STATES PATENTS

| 1,540,216 | 6/25 | Kneass | 137—512.1 |
| 1,550,376 | 8/25 | Longacre | 137—525 XR |
| 1,634,247 | 6/27 | Blom | 137—525 XR |

FOREIGN PATENTS

| 374,110 | 6/20 | Germany. |

M. CARY NELSON, *Primary Examiner.*